(12) United States Patent
Tanaka

(10) Patent No.: US 11,941,570 B2
(45) Date of Patent: Mar. 26, 2024

(54) ENVIRONMENT SENSITIVE TRANSPORTATION METHOD, DEVICE, AND APPARATUS

(71) Applicant: RAKUTEN GROUP, INC., Tokyo (JP)

(72) Inventor: Daiki Tanaka, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 301 days.

(21) Appl. No.: 17/392,337

(22) Filed: Aug. 3, 2021

(65) Prior Publication Data

US 2022/0083963 A1 Mar. 17, 2022

(30) Foreign Application Priority Data

Sep. 11, 2020 (JP) .................. 2020-152685

(51) Int. Cl.
*G06Q 10/083* (2023.01)
*G06Q 10/0832* (2023.01)
*G06Q 10/0833* (2023.01)
*G06Q 50/30* (2012.01)

(52) U.S. Cl.
CPC ..... *G06Q 10/0832* (2013.01); *G06Q 10/0833* (2013.01); *G06Q 50/30* (2013.01)

(58) Field of Classification Search
CPC ............................ G06Q 10/083; G06Q 50/30
See application file for complete search history.

(56) References Cited

U.S. PATENT DOCUMENTS

| 2016/0098679 | A1* | 4/2016 | Levy ..................... G06F 16/583 |
| | | | 705/28 |
| 2017/0091709 | A1* | 3/2017 | Mishra ............... G06Q 10/0838 |
| 2019/0061939 | A1* | 2/2019 | Anand .................. G08G 5/0069 |
| 2019/0122322 | A1* | 4/2019 | Perez ..................... G06F 16/23 |
| 2020/0167722 | A1* | 5/2020 | Goldberg ........... G06Q 10/0832 |
| 2021/0073715 | A1  | 3/2021 | Yamada et al. |

FOREIGN PATENT DOCUMENTS

WO 2019/146576 A1 8/2019

OTHER PUBLICATIONS

Frequently Asked Questions—FedEx Delivery Manager®, FedEx. com via archive.org, https://web.archive.org/web/20181011091632/https://www.fedex.com/en-us/faq/delivery-manager.html, Oct. 11, 2018 (Year: 2018).*

* cited by examiner

*Primary Examiner* — Resha Desai
*Assistant Examiner* — Michelle E Carey
(74) *Attorney, Agent, or Firm* — Sughrue Mion, PLLC

(57) ABSTRACT

A transport system S acquires load information of a load to be transported and environmental information obtained by sensing environment of the transport destination of the load, and determines a receiving time limit for the load in the environment of the transport destination on the basis of the acquired load information and the environmental information.

18 Claims, 9 Drawing Sheets

FIG. 7

| TYPE OF LOAD | TEMPERATURE | HUMIDITY | RECEIVING TIME LIMIT |
|---|---|---|---|
| FRESH FOOD | LOWER THAN 15° C | LOWER THAN 50% | 2 HOURS |
| | 15° C TO 25° C | 50% TO 80% | 1 HOUR |
| | OTHER THAN ABOVE | | 5 MINUTES |
| ELECTRICAL APPLIANCES | ... | ... | ... |
| ... | ... | ... | ... |

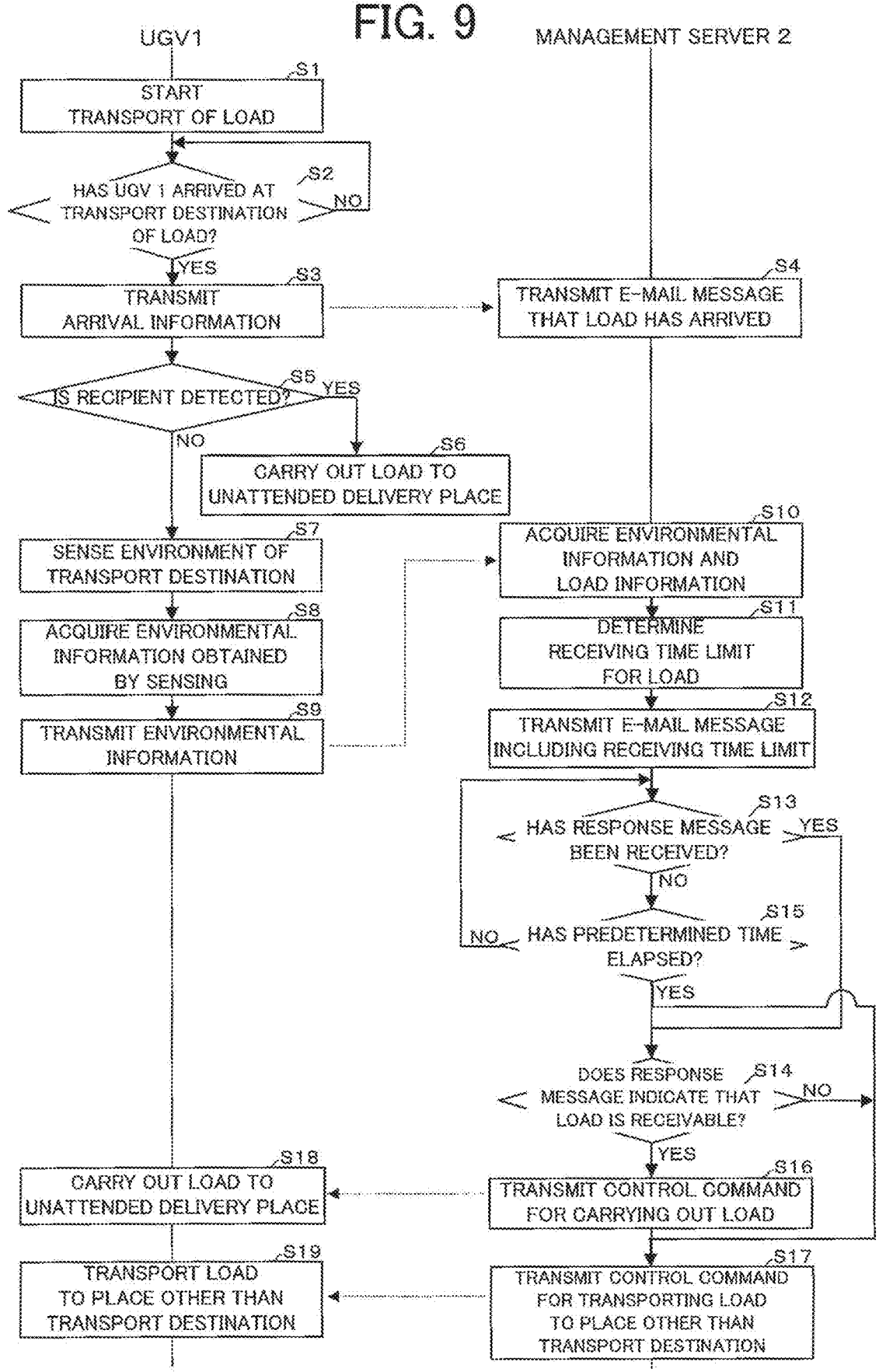

ENVIRONMENT SENSITIVE TRANSPORTATION METHOD, DEVICE, AND APPARATUS

CROSS REFERENCE TO RELATED APPLICATION

This application claims priority from Japanese Patent Application No. 2020-152685 which was filed on Sep. 11, 2020, the disclosure of which is herein incorporated by reference in its entirety.

TECHNICAL FIELD

One or more embodiments of the present invention relate to a technical field such as a system for transporting a load to a transport destination.

RELATED ART

Conventionally, for example, as a method for transporting a load such as a product purchased on an electronic commerce (EC) site, so-called "unattended delivery" of placing the load at an entrance, a storage, or the like of a transport destination is performed. According to the unattended delivery, since a recipient can receive a load in a non-face-to-face manner, the recipient does not need to be at home, and work cost associated with redelivery of the load can be reduced. JP 2020-53047 a discloses a technique for appropriately unlocking an automatic lock and transporting a load when the load is placed and arranged in an apartment building having an automatic locking facility.

However, in a case where a load with limited freshness such as fresh food is left at the transport destination for a long period of time due to the unattended delivery, there is a possibility that the load is damaged earlier than usual. Therefore, it is desirable that the receiving time be limited for each load in accordance with the environment of the transport destination of the load.

Therefore, one or more embodiments of the present invention are directed to providing a transport system, an information processing apparatus, and an information processing method capable of setting an appropriate receiving time limit for each load in accordance with the environment of the transport destination.

SUMMARY

In response to the above issue, the transport system includes: at least one memory configured to store program code; and at least one processor configured to access the program code and operate as instructed by the program code. The program code includes: load information acquisition code configured to cause at least one processor to acquire load information of a load to be transported; environmental information acquisition code configured to cause at least one processor to acquire environmental information obtained by sensing an environment of a transport destination of the load; and first determination code configured to cause at least one processor to determine a receiving time limit for the load in the environment of the transport destination on the basis of the load information and the environmental information.

The transport system may include a mobile body that includes a carry-out unit configured to carry out the load and transports the load.

The transport system may include a sensor configured to sense an environment of the transport destination.

The sensor may be mounted on a mobile body that transports the load.

The mobile body may be an unmanned mobile body that is unmanned and movable.

The program code may further include notification code configured to cause at least one processor to notify a recipient of the load of the receiving time limit for the load.

The program code may further include: receiving code configured to cause at least one processor to receive a response message from the recipient notified of the receiving time limit; and control code configured to cause at least one processor to perform control for transporting the load to a place other than the transport destination in a case where the response message indicates that the load is unreceivable.

The program code may further include control code configured to cause at least one processor to perform control for transporting the load to a place other than the transport destination in a case where there is no reply of a response message even after a predetermined time has elapsed from the notification of the receiving time limit.

The program code may further include control code configured to cause at least one processor to perform control for collecting the load in a case where receipt of the load cannot be confirmed even after the receiving time limit has elapsed after the load is placed at the transport destination.

The program code may further include transmitting code configured to cause at least one processor to transmit information indicating the receiving time limit to a mobile body different from the mobile body that transports the load at the transport destination.

The first determination code may cause the at least one processor to determine the receiving time limit for the load using data or a function that defines a relationship between an environment and a receiving time limit for each load type.

The first determination code may cause the at least one processor to determine the receiving time limit for the load using data or a function that defines a relationship between a combination of a type indicated by the load information and the environmental information, and a receiving time limit.

The environmental information acquisition code may cause the at least one processor to acquire environmental information on an area including the transport destination again in a case where a predetermined time has elapsed from determination of the receiving time limit. Further, the program code may include a second determination code configured to cause at least one processor to determine whether to update the receiving time limit on the basis of a change in the environmental information at the transport destination.

The sensing may be performed in a case where it is determined that the recipient is not able to receive the load directly at the transport destination.

The information processing apparatus includes: at least one memory configured to store program code; and at least one processor configured to access the program code and operate as instructed by the program code. The program code includes: load information acquisition code configured to cause at least one processor to acquire load information of a load to be transported; environmental information acquisition code configured to cause at least one processor to acquire environmental information obtained by sensing an environment of a transport destination of the load; and determination code configured to cause at least one-processor to determine a receiving time limit for the load in an environment of the transport destination on the basis of the load information and the environmental information.

The information processing method executed by one or a plurality of computers, includes: acquiring load information of a load to be transported; acquiring environmental information obtained by sensing an environment of a transport destination of the load; and determining a receiving time limit for the load in an environment of the transport destination on the basis of the load information and the environmental information.

BRIEF DESCRIPTION OF THE DRAWINGS

FIG. 7 is a diagram illustrating an example of a table that defines a relationship between a combination of a type of a load and environmental information and a receiving time limit.

FIG. 9 is a sequence diagram illustrating an example of an operation when a load is transported to a transport destination by the UGV 1.

DETAILED DESCRIPTION

Hereinafter, an embodiment of the present invention will be described with reference to the drawings.

[1. Configuration and Function Outline of Transport System S]

Figure 1:
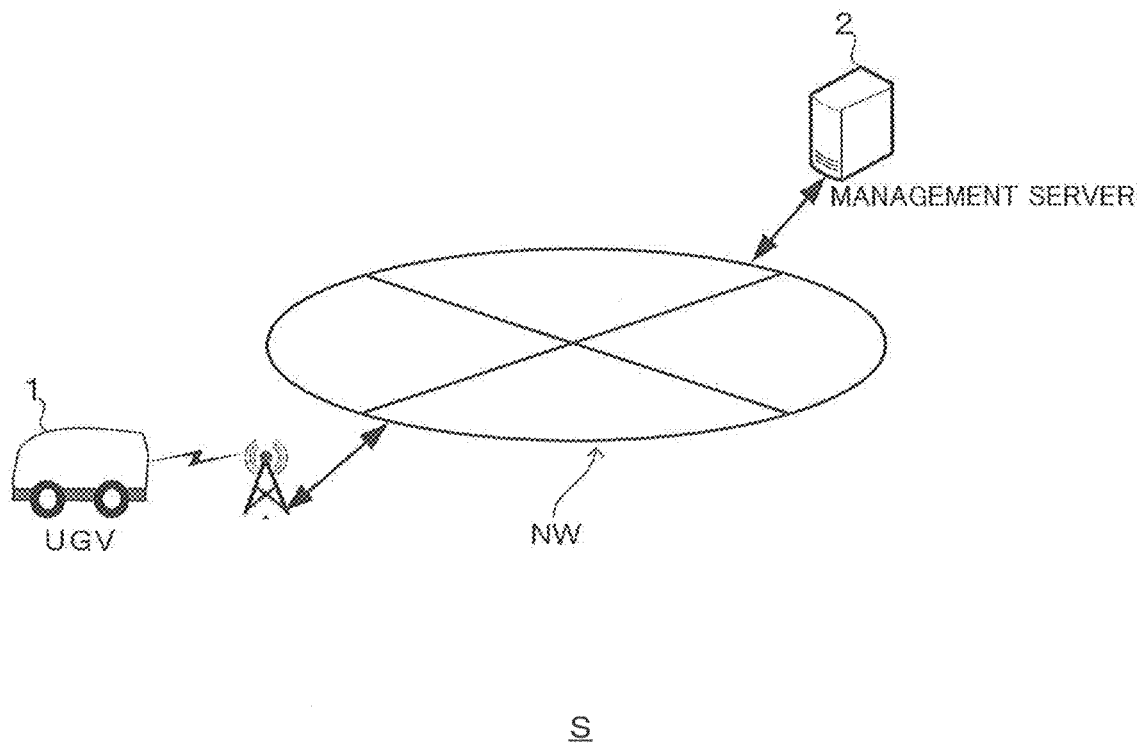
FIG. 1 is a diagram illustrating an outline configuration example of a transport system S according to a present embodiment.

First a configuration and a function outline of a transport system S according to an embodiment of the present invention will be described with reference to FIG. 1. FIG. 1 is a diagram illustrating an outline configuration example of the transport system S according to the present embodiment. As illustrated in FIG. 1, the transport system S includes an UGV (Unmanned Ground Vehicle) 1, a management server 2 (an example of an information processing device), and the like. The UGV 1 is an autonomous mobile body that is unmanned and autonomously movable. In the example of FIG. 1, one UGV 1 is illustrated, but in practice, there is a plurality of UGVs 1, and each UGV 1 is adapted to transport a load. The management server 2 is a server that manages information on a transported load. The UGV 1 and the management server 2 can be connected to a communication network NW and can communicate with each other via the communication network NW. The communication network MW includes, for example, the Internet, a mobile communication network, a radio base station thereof, and the like. Incidentally, although the UGV 1 illustrated in FIG. 1 shows an unmanned ground vehicle having a plurality of wheels for moving on the ground, the UGV 1 may be a mobile body such as a robot (for example, a biped walking robot) having no wheels.

In such a transport system S, the UGV 1 transports a carried load to a transport destination. Here, the load can also be referred to as an article or cargo. The load may foe, for example, a product (ordered item) ordered on an EC site. The transport destination of the load is, for example, a delivery place where the load is delivered, such as a house where the recipient of the load lives or an office where the recipient works. In the present embodiment, in a case where the recipient of the load cannot directly receive the load from the UGV 1 due to absence at the transport destination or the like, it is assumed that the UGV 1 places the load at a specific place (outside the house) as the transport destination and leaves the place (that is, the unattended delivery). The specific place (hereinafter, referred to as "unattended delivery place") where the load is placed may be, for example, a ground (for example, concrete, soil, gravel, or turf ground) in front of a doorway (entrance) of a house or an office, or the like, or in a storage installed near the doorway of the house or the office. Alternatively, in a case where the house is an apartment building (for example, a condominium or an apartment), the unattended delivery place may be in a storage (for example, a delivery box) installed near the common entrance of the apartment building, or in an apartment building dedicated UGV (that is, a UGV different from the UGV 1 that transports the load) that waits near the common entrance of the apartment building.

[1-1. Configuration and Function of UGV 1]

Figure 2:
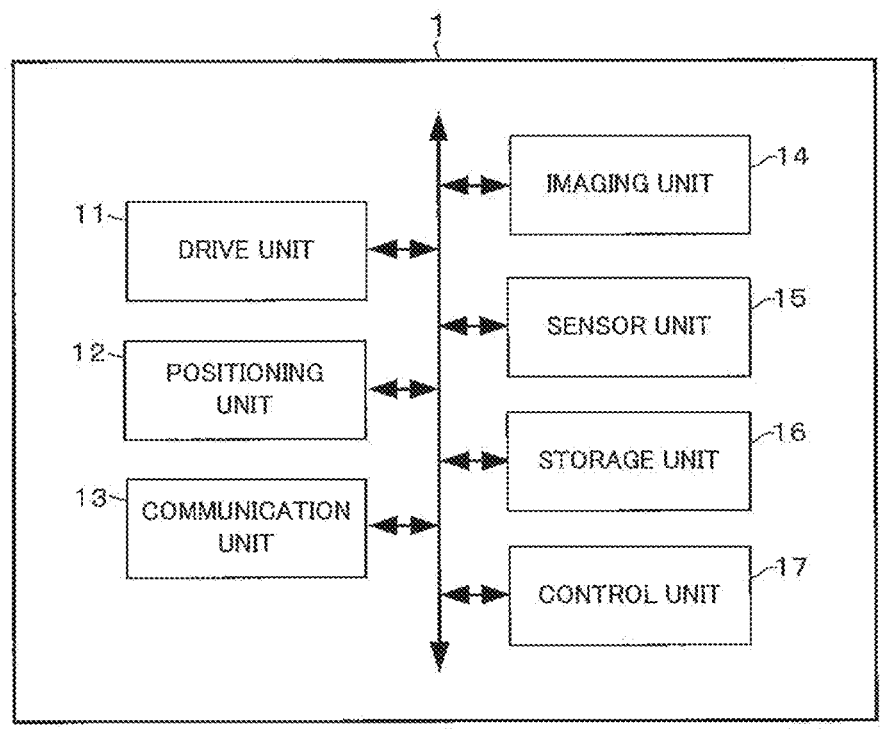
FIG. 2 is a diagram illustrating a schematic configuration example of an UGV 1.
Figure 3:
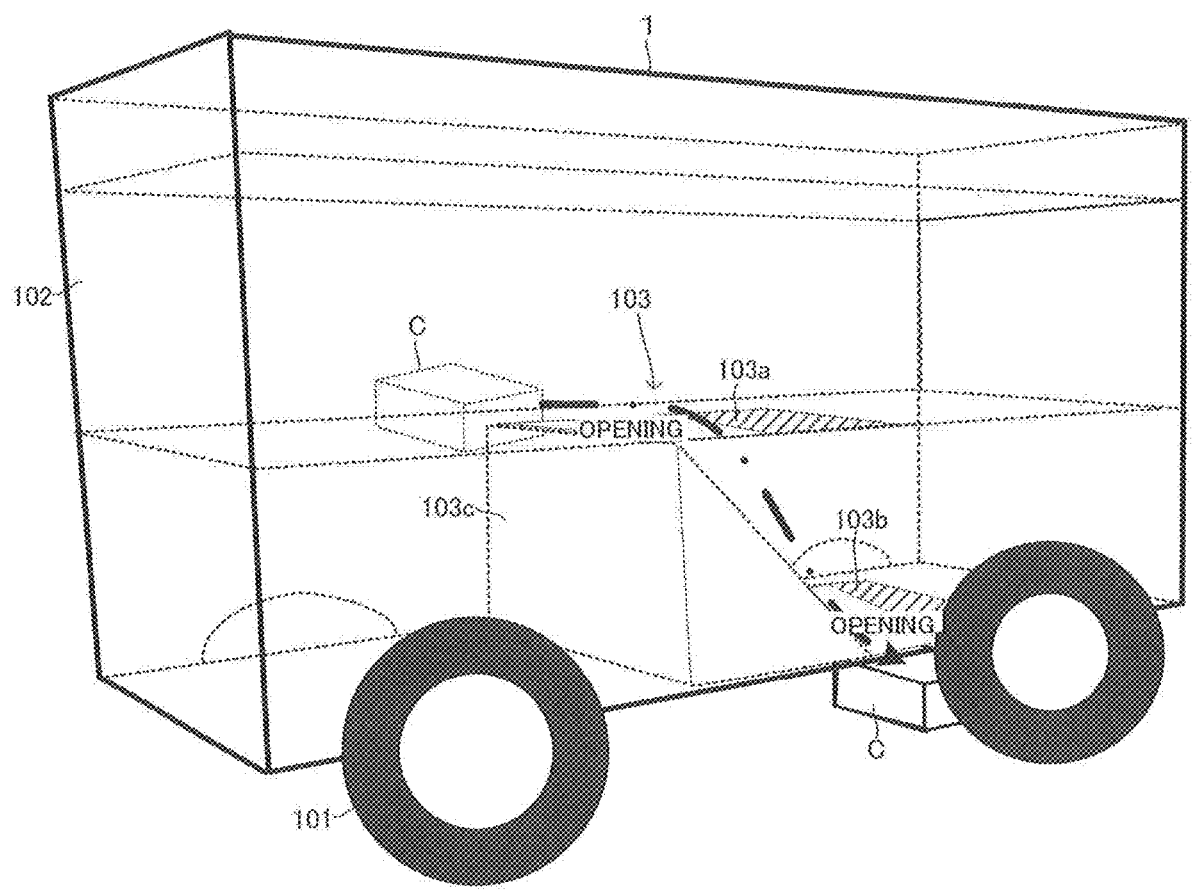
FIG. 3 is diagram illustrating an outline structure example of the appearance and the inside of the UGV 1.
Figure 4:
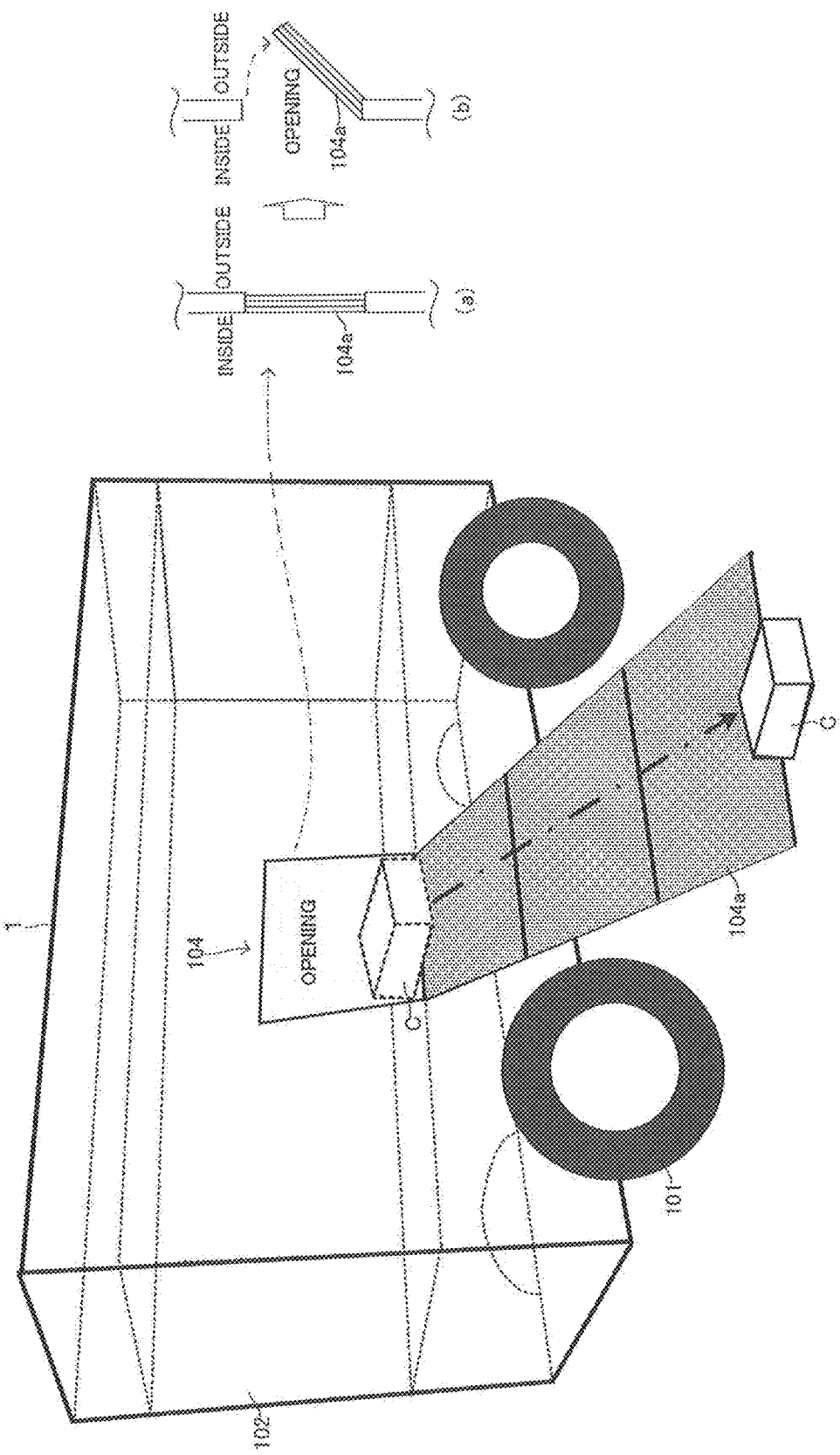
FIG. 4 is diagram illustrating an outline structure example of the appearance and the inside of the UGV 1.

Next, a configuration and a function the UGV 1 will be described with reference to FIG. 2. FIG. 2 is a diagram illustrating a schematic configuration example of the UGV 1. FIGS. 3 and 4 are diagrams illustrating an outline structure example of the appearance and the inside of the UGV 1. As illustrated in FIG. 2, the UGV 1 includes a drive unit 11, a positioning unit 12, a communication unit 13, an imaging unit 14, a sensor unit 15, a storage unit 16, a control unit 17, and the like. Incidentally, although not illustrated, the UGV 1 includes a battery that supplies power to each unit of the UGV 1. Moreover, as illustrated in FIGS. 3 and 4, the UGV 1 includes wheels 101, a load storage section 102, a load carry-in mechanism (not illustrated), a load carry-out mechanism (an example of carry-out unit) 103 (or 104), and the like.

The drive unit 11 includes a motor, a rotation shaft, and the like. The drive unit 11 rotates a plurality of wheels 101 by a motor driven according to a control signal output from the control unit 17, a rotating shaft, and the like. The storage section 102 can store (carry) a plurality of loads and has a refrigerating function. Moreover, although not illustrated, the storage section 102 is provided with a moving mechanism that moves the stored load to a designated position in the storage section 102 according to a control signal from the control unit 17.

The carry-out mechanism 103 illustrated in FIG. 3 includes an actuator (not illustrated) including open/close doors 103*a* and 103*b*, a slider 103*c*, a motor, and the like. The open/close doors 103*a* and 103*b* are configured to slide, for example, by an actuator that converts a control signal output from the control unit 17 into a mechanical operation. In the example of FIG. 3, a load C stored in the storage section 102 is moved to an upper portion of the slider 103*c* by the moving mechanism in the storage section 102, and as indicated by an arrow in the figure, the load C passes through an opening of a portion where the open/close door 103*a* is located, slides on the slider 103*c*, then passes through an opening of a portion where the open/close door 103*b* is located, and is finally carried out to the unattended delivery place.

On the other hand, the carry-out mechanism 104 illustrated in FIG. 4 includes an open/close door 104a, and an actuator (not illustrated) including a motor and the like. The open/close door 104a is configured to be stretchable by overlapping a plurality of thin plates (see (a)), and falls to the outside of the UGV 1 by an actuator that converts a control signal output from the control unit 17 into a mechanical operation (see (b)), so that the thin plates of the open/close door 104a extends to form a slider. In the example of FIG. 4, the load C stored in the storage section 102 is moved to a portion where the open/close door 104a is located by the moving mechanism in the storage section 102, and as indicated by an arrow in the figure, the load C passes through an opening of the portion, slides on the slider formed by the open/close door 104a, and is carried out to the unattended delivery place. Incidentally, the carry-out mechanism 103 (or 104) illustrated in FIGS. 3 and 4 is an example, and other configurations may be adopted. Moreover, when the unattended delivery place is a UGV dedicated to an apartment building, a transfer mechanism for transferring a load from the UGV 1 to the UGV dedicated to the apartment building is provided in each UGV.

The positioning unit 12 includes a radio wave receiver and the like. For example, the positioning unit 12 receives a radio wave transmitted from satellites of a GNSS (Global Navigation Satellite System) by the radio waver receiver, and detects the current position (latitude and longitude) of the UGV 1 on the basis of the radio wave. Incidentally, the current position of the UGV 1 may be specified by a SLAM (Simultaneous Localization And Mapping) processing in addition to radio waves transmitted from a GNSS satellite. Moreover, the current position of the UGV 1 may be corrected based on the image captured by the imaging unit 14. Position information indicating the current position detected by the positioning unit 12 is output to the control unit 17. The communication unit 13 controls communication performed via the communication network NW. Moreover, the communication unit 13 preferably has a near field radio communication function such as Bluetooth (registered trademark).

The imaging unit 14 includes, for example, a camera. The imaging unit 14 is used for movement control of the UGV 1. For example, the imaging unit 14 continuously images a real space within a range that falls within the angle of view of the camera. Image information captured by the imaging unit 14 is output to the control unit 17. The sensor unit 15 includes a sensor that senses the environment of the transport destination. By mounting such a sensor on the UGV 1, it is possible to more efficiently sense the environment of the transport destination. Examples of such a sensor include a temperature sensor, a humidity sensor, an atmospheric pressure sensor, a rainfall sensor, and the like, and the sensor unit 15 preferably includes at least a temperature sensor and a humidity sensor. Environmental information obtained by sensing the environment of the transport destination by the sensor unit 15 is output to the control unit 17. The environmental information includes, for example, at least one of temperature, humidity, and rainfall at the unattended delivery place of the transport destination. Incidentally, the sensor that senses the environment of the transport destination of the load may be installed at the transport destination (for example, a doorway of a house or an office, or near the common entrance of an apartment building).

The storage unit 16 includes a non-volatile memory or the like, and stores various programs and data. Moreover, the storage unit 16 stores a mobile body ID for identifying the UGV 1. The control unit 17 includes a CPU (Central Processing Unit), a ROM (Read Only Memory, a RAM (Random Access Memory), and the like, and executes various processes according to a program stored in a ROM (alternatively, a non-volatile memory may be used). For example, the control unit 17 performs movement control to move the UGV 1 to the transport destination of the load (for example, from a dispatch base to the transport destination of the load). In this movement control, the number of rotations of the wheel 101 and the position and the traveling direction of the UGV 1 are controlled using the position information acquired from the positioning unit 12, the image information acquired from the imaging unit 14, information on the transport destination of the load, and the like. As a result, the UGV 1 can autonomously move to the transport destination. Here, the information on the transport destination of the load may be set in the UGV 1 at, for example, a dispatch base of the load (in other words, a loading base of the load), or may be transmitted from the management server 2. The information on the transport destination of the load includes, for example, a load ID for identifying the load and location information of the transport destination of the load. The location information of the transport destination may be a transport destination address or position information (latitude and longitude) of the transport destination.

Moreover, when the UGV 1 arrives at the transport destination, the control unit 17 activates the sensor unit 15 and acquires environmental information obtained by sensing the environment of the transport destination (acquires the environmental information as an environmental information acquisition unit). Then, the control unit 17 causes the communication unit 13 to transmit (send) the mobile body ID of the UGV 1 together with the acquired environmental information to the management server 2. Thereafter, the control unit 17 performs carry-out control for carrying out the load at the unattended delivery place of the transport destination. For example, the control unit 17 adjusts the position of the UGV 1 on the basis of, for example, the image information acquired from the imaging unit 14, and then outputs a control signal to the moving mechanism in the storage section 102 and the carry-out mechanism 103 (or 104) to cause the carry-out mechanism 103 (or 104) to carry out the load to the unattended delivery place.

Incidentally, the control unit 17 may cause the communication unit 13 to transmit the position information indicating the current position of the UGV 1 and carrying possibility information of the load to the management server 2 in time series. Here, the carrying possibility information of the load indicates whether or not the load can be carried at the present time. "Transmit in time series" means that it is continuously transmitted a plurality of times with the passage of time. A time interval at which the position information and the carrying possibility information are transmitted (that is, a transmitting interval) may be a regular interval or an irregular interval.

[1-2. Configuration and Function of Management Server 2]

Figure 5:
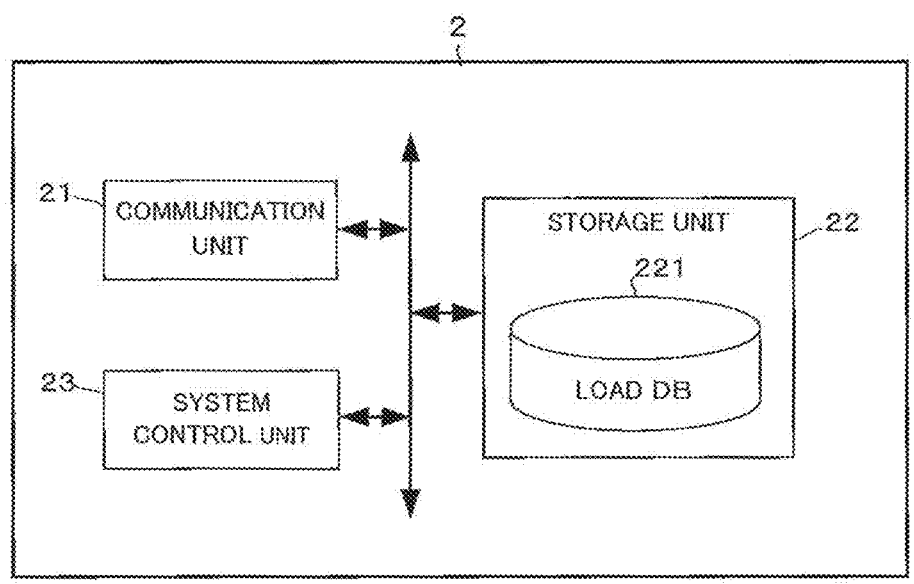
FIG. 5 is a diagram illustrating a schematic configuration example of a management server 2.

Next, a configuration and a function of the management server 2 will be described with reference to FIG. 5 and the like. FIG. 5 is a diagram illustrating a schematic configuration example of the management server 2. As illustrated in FIG. 5, the management server 2 includes a communication unit 21, a storage unit 22, a control unit 23, and the like. The communication unit 21 controls communication performed via the communication network NW. The storage unit 22 includes, for example, a hard disk drive or the like, and stores various programs and data. For example, a load database (DB) 221 and the like are constructed in the storage unit 22. In the load database 221, a load ID of a load, load information of a load, information on a transport destination of a load, a mobile body ID of the UGV 1 that transports a load, information of a recipient of a load (for example, the recipient's name and electronic mail address), and the like are stored in association with each load.

Here, the load information of the load includes a type of load. Examples of the type of load include food, beverages, clothing, medical articles, daily necessities, electrical appliances, and books. The food is preferably classified into food requiring freezing (frozen food) and food not requiring freezing. Moreover, the food is preferably classified into food requiring refrigeration (for example, fresh food such as vegetables, fruits, fresh fish, and fresh meat) and food not requiring refrigeration (for example, processed food or the like). Moreover, the electrical appliances are preferably classified into a product including a precision component such as an electronic component and a product not including a precision component. Incidentally, the load information of the load may include, together with the type of load (alternatively, instead of the type), the presence or absence of resistance to a predetermined temperature range (for example, 15° C. or higher), the presence or absence of resistance to a predetermined humidity range (for example, 60% or higher), and the presence or absence of resistance to flooding.

Moreover, the load database 221 may store position information indicating the current position of the UGV 1, carrying possibility information of the load, address information for accessing the UGV 1, and the like in association with the mobile body ID of the UGV 1 that transports the load. Here, the position information and the carrying possibility information of the load are updated each time the communication unit 21 receives the information from the UGV 1.

The control unit 23 includes at least one CPU (an example of processor), a ROM, a RAM, and the like, and executes various processes according to a program stored in a ROM (alternatively, a non-volatile memory may be used). The ROM or the non-volatile memory is configured to store a program (program code). The CPU is configured to access the program code and operate as instructed by the program code. The program code includes: load information acquisition code configured to cause the CPU to acquire the load information; environmental information acquisition code configured to cause the CPU to acquire the environmental information; and first determination code configured to cause the CPU to determine a receiving time limit for the load in the environment of the transport destination on the basis of the load information and the environmental information. Further, the program code may include notification code configured to cause the CPU to notify a recipient of the load of the receiving time limit for the load. Further, the program code may include: receiving code configured to cause the CPU to receive a response message from the recipient notified of the receiving time limit; and control code configured to cause the CPU to perform control for transporting the load to a place other than the transport destination in a case where the response message indicates that the load is unreceivable. Further, the program code may include control code configured to cause the CPU to perform control for transporting the load to a place other than the transport destination in a case where there is no reply of a response message even after a predetermined time has elapsed from the notification of the receiving time limit. Further, the program code may include control code configured to cause the CPU to perform control for collecting the load in a case where receipt of the load cannot be confirmed even after the receiving time limit has elapsed after the load is placed at the transport destination. Further, the program code may include transmitting code configured to cause the CPU to transmit information indicating the receiving time limit to a mobile body different from the mobile body that transports the load at the transport destination. Further, the program code may include a second determination code configured to cause the CPU to determine whether to update the receiving time limit on the basis of a change in the environmental information at the transport destination.

Figure 6:
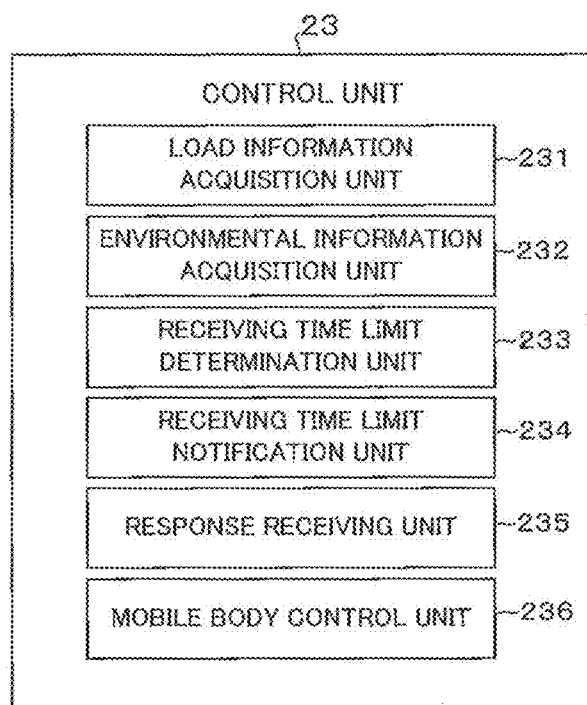
FIG. 6 is a diagram illustrating an example of functional blocks in a control unit 23.

FIG. 6 is a diagram illustrating an example of functional blocks in the control unit 23. By executing the program, the control unit 23 functions as a load information acquisition unit 231, an environmental information acquisition unit 232, a receiving time limit determination unit 233, a receiving time limit notification unit 234, a response receiving unit 235, a mobile body control unit 236, and the like as illustrated in FIG. 6, in accordance with the program code stored in, for example, the ROM or the non-volatile memory.

The load information acquisition unit 231 acquires the load information of the load transported by the UGV 1 from, for example, the load database 221. The environmental information acquisition unit 232 acquires, for example, from the UGV 1, environmental information obtained by sensing the environment of the transport destination of the load transported by the UGV 1. Incidentally, in some cases, a sensor device that senses the environment of the transport destination is installed at the transport destination, and the environmental information obtained by the sensor is transmitted to the management server 2 via the communication network NW. In such a case, the environmental information acquisition unit 232 may acquire the environmental information from a sensor installed at the transport destination.

The receiving time limit determination unit 233 determines a time limit for receiving the load in the environment of the transport destination of the load on the basis of the load information acquired by the load information acquisition unit 231 and the environmental information acquired by the environmental information acquisition unit 232. The receiving time limit determined by the receiving time limit determination unit 233 is set, for example, for notification to the recipient of the load or for a timer. Here, the receiving time limit for the load is a time limit in which the load is continuously placed at the unattended delivery place. The receiving time limit may be represented by a duration (for example, x hours) from when the load is placed, or may be represented by a time (for example, y (hour): z (minute)). That is, the load is limited to being placed beyond the duration or the time.

The receiving time limit determination unit 233 determines the receiving time limit for the load using, for example, data (for example, a table) or a function that defines a relationship between a combination of the type of the load and the environmental information and the receiving time limit. FIG. 7 is a diagram illustrating an example of a table that defines the relationship between the combination of the type of the load and the environmental information and the receiving time limit. In the example of FIG. 7, the receiving time limit is associated with a combination of fresh food, and temperature and humidity. According to the example of FIG. 7, in a case where the load transported toy the UGV 1 is fresh food and the temperature at the transport destination of the load is 20° C. and the humidity is 50%, the receiving time limit is determined to be 1 hour.

As an example different from that of FIG. 7, the receiving time limit determination unit 233 may determine a receiving time limit by using a function that calculates the receiving time limit by substituting a value obtained by quantifying the type indicated in the acquired load information and the acquired environmental information. Alternatively, the receiving time limit determination unit 233 may determine the receiving time limit using an estimation model (function group) in which a value obtained by quantifying the type indicated in the acquired load information and the acquired environmental information is input and the receiving time limit is output. In this case, machine learning of the estimation model may be performed using correct answer data regarding the receiving time limit and a data set of the type of the load and the environmental information as teacher data. By inputting a value obtained by quantifying the type of the load indicated in the acquired load information and the acquired environmental information to such a learned estimation model, a more appropriate receiving time limit can be obtained from the learned estimation model.

As still another example, the receiving time limit determination unit 233 may determine a receiving time limit using data (for example, a table) or a function that defines a relationship between the environmental information and the receiving time limit for each load type. For example, an appropriate receiving time limit is determined by specifying the receiving time limit associated with the acquired environmental information from the "table that defines the relationship between the environmental information and the receiving time limit" corresponding to the type indicated in the acquired load information. Alternatively, an appropriate receiving time limit is determined by substituting a value obtained by quantifying the acquired environmental information into "the function that defines the relationship between the environmental information and the receiving time limit" corresponding to the type indicated in the acquired load information.

The receiving time limit notification unit 234 notifies the recipient of the load of the receiving time limit determined by the receiving time limit determination unit 233. As a result, it is possible to prevent the load from being left as much as possible even after the receiving time limit has elapsed. For example, the receiving time limit notification unit 234 transmits an electronic mail indicating a message including the receiving time limit to the electronic mail address of the recipient associated with the acquired load information. As a result, the electronic mail is acquired from a mail server by a terminal of the recipient, and the message including the receiving time limit is displayed on the terminal or is output by voice from the terminal. As an example of the message, a message "Please receive the load within x hours from now." or a message "Please receive the load by y (hour): z (minute)." is displayed. The message including the receiving time limit may be directly pushed and delivered from the management server 2 to the terminal of the recipient without passing through the mail server.

Figure 8:
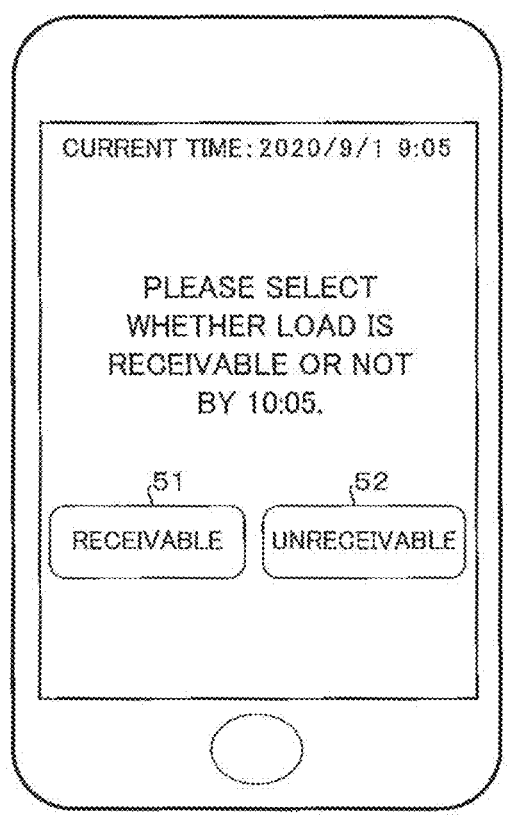
FIG. 8 is a diagram illustrating a display screen example for returning a response message.

Moreover, the recipient notified of the receiving time limit may return, from the terminal, a response message indicating whether or not the load can be received at the transport destination within the receiving time limit. FIG. 8 is a diagram illustrating a display screen example for returning a response message. The display screen illustrated in FIG. 8 is displayed on the terminal by designating, by the recipient, a URL (Uniform Resource Locator) set in a message (for example, a message received from the mail server or the management server 2) displayed on the terminal of the recipient. On the display screen illustrated in FIG. 8, a button 51 indicating that the load is receivable and a button 52 indicating that the load is unreceivable are selectively displayed. When the button 51 indicating that the load is receivable is selected on the display screen by the recipient, a response message indicating that the load is receivable is transmitted to the management server 2. On the other hand, when the button 52 indicating that the load is unreceivable is selected on the display screen by the recipient, a response message indicating that the load is unreceivable is transmitted to the management server 2. As a result, it is possible to reliably prevent the load from being left even after the receiving time limit has elapsed.

The response receiving 235 receives, via the communication unit 21, the response message from the terminal of the recipient notified of the receiving time limit by the receiving time limit notification unit 234. In a case where the response message received by the response receiving unit 235 indicates that the load is receivable, the mobile body control unit 236 performs control for carrying out the load at the unattended delivery place of the transport destination. For example, the mobile body control unit 236 causes the communication unit 21 to transmit a control command for carrying out the load to the UGV 1. As a result, the UGV 1 carries out the load to the unattended delivery place. On the other hand, in a case where the response message received by the response receiving unit 235 indicates that the load is unreceivable, the mobile body control unit 236 performs control for transporting the load to a place other than the transport destination. For example, the mobile body control unit 236 causes the communication unit 21 to transmit a control command for returning the load to a return location of the UGV 1 (for example, a dispatch base of the load) or a control command for moving the load to the next transport destination. Alternatively, the mobile body control unit 236 may cause the communication unit 21 to transmit, to the UGV 1, a control command for moving the load to the temporary storage location of the load.

[2. Operation of Transport System S]

Next, the operation of the transport system S according to the present embodiment will be described with reference to FIG. 9. FIG. 9 is a sequence diagram illustrating an example of an operation when a load is transported to a transport destination by the UGV 1. In this operation example, it is assumed that the transport destination information is set to the UGV 1 at the dispatch base of the load. The transport destination information includes the location information of the transport destination and the load ID of the load to be transported. Incidentally, the transport destination information may include the electronic mail address of the recipient of the load.

In FIG. 9, the UGV 1 starts transport from the dispatch base to the transport destination of the load in accordance with the transport destination information (step S1), and then determines whether the UGV 1 has arrived at the transport destination of the load on the basis of the position information of the UGV 1 and the location information of the transport destination (step S2). Incidentally, this determination is repeatedly performed at predetermined time intervals. It may be determined whether or not the UGV 1 has approached the transport destination of the load (for example, whether or not the distance to the transport destination has reached several meters). Then, in a case where it is determined that the UGV 1 has arrived at (or approached) the transport destination of the load (step S2: YES), the UGV 1 transmits the mobile body ID of the UGV 1 to the management server 2 via the communication network NW together with arrival information to the transport destination of the load (step S3).

Next, upon acquiring the arrival information and the mobile body ID from the UGV 1, the management server 2 transmits an electronic mail indicating a message that the load has arrived to the electronic mail address of the recipient associated with the mobile body ID (step S4). Incidentally, the electronic nail may be transmitted from the UGV 1 to the recipient's electronic mail address. Alternatively, in a case where a call chime capable of receiving a short-range wireless signal is installed at the transport destination, the UGV 1 may transmit the short-range wireless signal instead of transmitting the electronic mail indicating the message that the load has arrived.

Then, when the recipient of the load appears from the doorway (for example, an entrance of a house or an office) of the transport destination in response to the receipt of the electronic mail by the terminal of the recipient of the load or the ringing of the ringing chime, the UGV 1 detects the recipient (step S5: YES), carries out the load to the unattended delivery place (step S6), and returns to the return location or moves to the next transport destination. On the other hand, when the recipient cannot be detected within a predetermined time (for example, several minutes) from the transmission of the arrival information (step S5: NO), the UGV 1 determines that the recipient cannot directly receive the load, activates the sensor unit 15 to sense the environment of the transport destination (step S7), and acquires environmental information obtained by the sensing (step S8). That is, sensing of the environment of the transport destination is performed when it is determined that the recipient cannot directly receive the load at the transport destination. Next, the UGV 1 transmits the mobile body ID of the UGV 1 to the management server 2 via the communication network NW together with the environmental information acquired in step S8 (step S9).

Incidentally, in a case where the sensor device that senses the environment of the transport destination is installed at the transport destination, the management server 2 may transmit a sensing command of the environment of the transport destination to the sensor device when acquiring the arrival information from the UGV 1. In response to the sensing command from the management server 2, the sensor device senses the environment of the transport destination, and transmits environmental information obtained by the sensing to the management server 2. In this case, the UGV 1 may not perform sensing of the environment of the transport destination (that is, the processing of steps S7 to S9 becomes unnecessary).

Next, upon acquiring the environmental information and the mobile body ID from the UGV 1, the management server 2 acquires the load information associated with the mobile body ID and the mail address of the recipient from the load database 221 (step S10). Incidentally, as described above, the management server 2 may acquire the environmental information from the sensor device. Next, based on the environmental information and the load information acquired in step S10, the management server 2 determines the receiving time limit for the load in the environment of the transport destination of the load transported by the UGV 1 (step S11). Next, the management server 2 sets a message including the receiving time limit determined in step S11 in an electronic mail, and transmits the electronic mail indicating the message including the receiving time limit to the electronic mail address of the recipient of the load (step S12).

Next, the management server 2 determines whether or not a response message has been received from the terminal of the recipient of the load according to the electronic mail transmitted in step S12 (step S13). When the management server 2 determines that the response message has been received (step S13: YES), the process proceeds to step S14. On the other hand, when the management server 2 determines that the response message has not been received (step S13: NO), the management server 2 determines whether or not a predetermined time (for example, several minutes) has elapsed from the transmitting of the electronic mail in step S12 (step S15). In a case where the management server 2 determines that the predetermined time has elapsed from the transmitting of the electronic mail (step S15: YES), that is, in a case where there is no reply of the response message even after the predetermined time has elapsed from the notification of the receiving time limit, the management server 2 assumes that the load is unreceivable, and the process proceeds to step S17. On the other hand, when the management server 2 determines that the predetermined time has not elapsed from the transmitting of the electronic mail (step S15: NO), the process returns to step S13.

In step S14, the management server 2 determines whether or not the response message received in step S13 indicates that the load is receivable. When the management server 2 determines that the response message indicates that the load is receivable (step S14: YES), the process proceeds to step S16. On the other hand, when the management server 2 determines that the response message does not indicate that the load is receivable (that is, it indicates that the load is unreceivable) (step 214: NO), the process proceeds to step S17.

In step S16, the management server 2 transmits, to the UGV 1 via the communication network MW, a control command for carrying out the load at the unattended delivery place of the transport destination. In response to such a control command, the UGV 1 carries out the load to the unattended delivery place (step S18), and returns to the return location or moves to the next transport destination. On the other hand, in step S17, the management server 2 transmits, to the UGV 1 via the communication network MW, a control command for transporting the load to a place other than the transport destination. In response to the control command, the UGV 1 transports the load to a place other than the transport destination (step S13).

As described above, according to the above embodiment, it is configured such that the load information of the load to be transported and the environmental information obtained by sensing the environment of the transport destination of the load are acquired, and the receiving time limit for the load in the environment of the transport destination is determined based on the acquired load information and environmental information. Therefore, it is possible to set an appropriate receiving time limit for each load in accordance with the environment of the transport destination, which can prevent the load from being left at the transport destination for a long period of time due to the unattended delivery.

(Modification 1)

In the above embodiment, when the management server 2 transmits a control command for carrying out the load at the unattended delivery place of the transport destination to the UGV 1, the management server 2 may set the receiving time limit in a receipt confirmation timer to start counting. In this case, in a case where the management server 2 cannot confirm the receipt of the load placed at the transport destination until the receipt confirmation timer counts up (that is, until the receiving time limit elapses), the management server 2 refers to the position information and the carrying possibility information of the UGV 1 in the load database 221, and searches for, for example, the UGV 1 that can carry the load and is located closest to the transport destination as a load collection UGV. Then, the management server 2 transmits a load collection command to the found load collection UGV. That is, in a case where the management server 2 cannot confirm the receipt of the load even after the receiving time limit has elapsed after the load is placed at the transport destination, the management server 2 performs control for collecting the load. In response to the collection command, the load collection UGV moves to the transport destination to collect the load and, for example, returns to the dispatch base of the load or moves to the next transport destination. As a result, even in a case where the load is not received until the receiving time limit elapses due to the reason on the recipient side, it is possible to reliably prevent the load from being left for a long period of time even after the receiving time limit has elapsed. Incidentally, the receipt confirmation of the load placed at the transport destination is preferably performed, for example, by receiving a receipt message transmitted from the terminal of the recipient who has received the load by the management server 2. In this case, for example, a button indicating the receipt confirmation of the load is displayed on the display screen of the terminal of the recipient, and when the button is selected by the recipient, a receipt message indicating the receipt of the load is transmitted to the management server 2. However, the management server 2 may confirm the receipt of the load by other methods. For example, in a case where a monitoring device including a camera is installed at a transport destination, in a case where the monitoring device detects that a load is received based on a video captured by the camera, the monitoring device may transmit a receipt message indicating receipt of the load to the management server 2.

(Modification 2)

In the above embodiment, in a case where the unattended delivery place of the load is an apartment building dedicated UGV that waits near the common entrance of the apartment building, the management server 2 may transmit, to the UGV 1, information indicating the receiving time limit together with a control command for carrying out the load at the unattended delivery place of the transport destination, for example. In this case, when delivering the load to the apartment building dedicated UGV in response to the control command from the management server 2, the UGV 1 transmits information indicating the receiving time limit received from the management server 2 to the apartment building dedicated UGV by, for example, near field radio communication. Incidentally, the information indicating the receiving time limit may be transmitted from the management server 2 to the apartment building dedicated UGV, Then, the apartment building dedicated UGV that has received the load and has received the information indicating the receiving time limit sets the receiving time limit in the receipt confirmation timer to start counting, moves to, for example, a waiting place (may be in front of the room of the recipient of the load) in the apartment building, and waits there. Thereafter, in a case where the recipient of the load cannot be detected until the receipt confirmation timer counts up (that is, when the recipient does not appear), the apartment building dedicated UGV moves to, for example, the dispatch base of the load and collects the load (on the other hand, in a case where the recipient can be detected, the load is carried out). As a result, even in a case where the load is not received until the receiving time limit elapses due to the reason on the recipient side, it is possible to reliably prevent the load from being left for a long period of time even after the receiving time limit has elapsed. Incidentally, in a case where the apartment building dedicated UGV is provided with a refrigerating function or the like, the apartment building dedicated UGV may store the load even after the receiving time limit has elapsed, and therefore, the information indicating the receiving time limit does not need to be transmitted from the UGV 1 (or the management server 2) to the apartment building dedicated UGV, and the apartment building dedicated UGV does not need to move to the dispatch base and collect the load.

(Modification 3)

In the above embodiment, in a case where a predetermined time (for example, several tens of minutes) has elapsed from the determination of the receiving time limit, the management server 2 (environmental information acquisition unit 232) may acquire the environmental information on an area including the transport destination again. In this case, the management server 2 (a second determination unit) determines whether to update the receiving time limit on the basis of a change in the environmental information at the transport destination. As a result, the receiving time limit can be appropriately updated in response to the change in the environment with the lapse of time. Here, the environmental information acquired again may be obtained by sensing of a sensor installed at the transport destination of the load, or may be obtained by sensing of the UGV 1 that has transported the load to the transport destination or a UGV different from the UGV 1. For example, in a case where the change between the environmental information acquired before the determination of the receiving time limit and the environmental information acquired after the determination of the receiving time limit is equal to or more than a threshold value (that is, when the change in the environment is large), it is determined that the receiving time limit is updated. Alternatively, the environmental information acquired again may be environmental information around the transport destination where the load is placed (for example, the temperature in the city of the transport destination) and may be provided from a predetermined server. For example, by comparing the environmental information acquired before the determination of the receiving time limit with the environmental information acquired from the server, the environmental information at the transport destination after a predetermined time is estimated. Then, in a case where the change between the environmental information acquired before the determination of the receiving time limit and the estimated environmental information is equal to or more than the threshold value (that is, when the change in the environment is large), it is determined that the receiving time limit is updated. In a case where the management server 2 determines that the receiving time limit is to be updated, the management server 2 updates the already determined receiving time limit (for example, the receiving time limit determined in step S11 in FIG. 9). As a result, the management server 2 may set a message including the updated receiving time limit in an electronic mail, and may retransmit the electronic mail indicating the message including the receiving time limit to the electronic mail address of the recipient of the load. Moreover, in the modification 1, the updated receiving time Unit may be reset in the receipt confirmation timer to resume the counting.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. For example, although the example in which the determination unit that determines the receiving time limit, the notification unit that notifies the receiving time limit, and the receiving unit that receives the response message in the present invention are provided in the management server 2 has been described, some of these components may be provided in a device (UGV 1) or the like other than the management server 2. Moreover, in the above embodiment, the UGV which is unmanned and autonomously movable has been described as an example, but the present embodiment is also applicable to a mobile body such as a vehicle driven by a person.

REFERENCE SIGNS LIST

1 UGV
2 Management server
11 Drive unit
12 Positioning unit
13 Communication unit
14 Imaging unit
15 Sensor unit
16 Storage unit
17 Control unit
101 wheels
102 Load storage section
103, 104 Load carry-out mechanism
21 Communication unit
22 Storage unit
23 Control unit
231 load information acquisition unit
232 Environmental information acquisition unit
233 Receiving time limit determination unit
234 Receiving time limit notification unit
235 Response receiving unit
236 Mobile body control unit
NW Communication network
S Transport system

What is claimed is:

1. A transport system comprising:
    a first mobile body that includes a carry-out unit configured to carry out a load to be transported and transport the load;
    at least one memory configured to store program code; and at least one processor configured to access the program code and operate as instructed by the program code, the program code including:
    load information acquisition code configured to cause at least one processor to acquire load information of the load to be transported;
    environmental information acquisition code configured to cause at least one processor to acquire environmental information obtained by sensing an environment of a transport destination of the load;
    first determination code configured to cause at least one processor to determine a receiving time limit for the load in the environment of the transport destination on the basis of the load information and the environmental information;
    second determination code configured to cause at least one processor to determine whether the load has been received; and
    collection code configured to cause at least one processor to search for, based on the receiving time limit elapsing and the load having not been received, a second mobile body nearest to the transport destination and able to transport the load, and cause the second mobile body to collect the load.

2. The transport system according to claim 1, further comprising a sensor configured to sense an environment of the transport destination.

3. The transport system according to claim 2, wherein the sensor is mounted on the first mobile body.

4. The transport system according to claim 1, wherein the first and second mobile bodies are unmanned mobile bodies that are unmanned and movable.

5. The transport system according to claim 1, the program code further including notification code configured to cause at least one processor to notify a recipient of the load of the receiving time limit for the load.

6. The transport system according to claim 5, the program code further including:
    receiving code configured to cause at least one processor to receive a response message from the recipient notified of the receiving time limit; and
    control code configured to cause at least one processor to perform control for transporting the load to a place other than the transport destination in a case where the response message indicates that the load is unreceivable.

7. The transport system according to claim 5, the program code further including control code configured to cause at least one processor to perform control for transporting the load to a place other than the transport destination in a case where there is no reply of a response message even after a predetermined time has elapsed from the notification of the receiving time limit.

8. The transport system according to claim 1, the program code further including control code configured to cause at least one processor to perform control for collecting the load in a case where receipt of the load cannot be confirmed even after the receiving time limit has elapsed after the load is placed at the transport destination.

9. The transport system according to claim 1, wherein the first determination code causes the at least one processor to determine the receiving time limit for the load using data or a function that defines a relationship between an environment and a receiving time limit for each load type.

10. The transport system according to claim 1, wherein the first determination code causes the at least one processor to determine the receiving time limit for the load using data or a function that defines a relationship between a combination of a type indicated by the load information and the environmental information, and a receiving time limit.

11. The transport system according to claim 1, wherein
    the environmental information acquisition code causes the at least one processor to acquire environmental information on an area including the transport destination again in a case where a predetermined time has elapsed from determination of the receiving time limit, and
    the program code further includes a second determination code configured to cause at least one processor to determine whether to update the receiving time limit on the basis of a change in the environmental information at the transport destination.

12. The transport system according to claim 1, wherein the sensing is performed in a case where it is determined that the recipient is not able to receive the load directly at the transport destination.

13. The transport system according to claim 1, wherein the second determining code is configured to determine whether the load has been received based on a monitoring device including a camera installed at the transport destination, and based on detecting receipt of the load, transmitting a message indicating receipt of the load to a management server.

14. The transport system according to claim 1, wherein the mobile body is equipped with a controller that controls to autonomously move the mobile body to the transport destination.

15. The transport system according to claim 1, wherein the mobile body is equipped with a sensor configured to sense an environment of the transport destination.

16. The transport system according to claim 1, wherein the transport system comprises a server comprising at least one memory configured to store program code; and at least one processor configured to access the program code and operate as instructed by the program code;
- wherein the mobile body transmits, to the server, the environmental information acquired by the sensor; and
- wherein the program code includes environmental information acquisition code configured to cause at least one processor to acquire the environmental information from the mobile body.

17. An information processing apparatus comprising:
- at least one memory configured to store program code; and
- at least one processor configured to access the program code and operate as instructed by the program code, the program code including:
- load information acquisition code configured to cause at least one processor to acquire load information of a load to be transported by a first mobile body able to transport the load;
- environmental information acquisition code configured to cause at least one processor to acquire environmental information obtained by sensing an environment of a transport destination of the load;
- determination code configured to cause at least one processor to determine a receiving time limit for the load in the environment of the transport destination on the basis of the load information and the environmental information
- second determination code configured to cause at least one processor to determine whether the load has been received; and
- collection code configured to cause at least one processor to search for, based on the receiving time limit elapsing and the load having not been received, a second mobile body nearest to the transport destination and able to transport the load, and cause the second mobile body to collect the load.

18. An information processing method executed by one or a plurality of computers,
the method including:
- acquiring load information of a load to be transported;
- acquiring environmental information obtained by sensing an environment of a transport destination of the load;
- determining a receiving time limit for the load in the environment of the transport destination on the basis of the load information and the environmental information;
- determining whether the load has been received; and
- searching for, based on the receiving time limit elapsing and the load having not been received, a second mobile body nearest to the transport destination and able to transport the load, and causing the second mobile body to collect the load.

* * * * *